(12) United States Patent
Poyas

(10) Patent No.: US 7,661,224 B1
(45) Date of Patent: Feb. 16, 2010

(54) APPARATUS FOR STAKING TREES

(76) Inventor: Robert Poyas, 15 Brush Pl., San Francisco, CA (US) 94103

( * ) Notice: Subject to any disclaimer, the term of this patent is extended or adjusted under 35 U.S.C. 154(b) by 238 days.

(21) Appl. No.: 11/471,852

(22) Filed: Jun. 20, 2006

Related U.S. Application Data

(60) Provisional application No. 60/772,306, filed on Feb. 10, 2006.

(51) Int. Cl.
*A01G 17/10* (2006.01)

(52) U.S. Cl. .............................. 47/42; 47/43; 248/218.4

(58) Field of Classification Search ............ 47/42, 47/32.4–32.6, 44–45, 47, 43; 248/218.4, 248/508; 24/278, 279; 292/256, 301
See application file for complete search history.

(56) References Cited

U.S. PATENT DOCUMENTS

| | | | | | |
|---|---|---|---|---|---|
| 1,031,941 | A | * | 7/1912 | Lanham | 47/32.4 |
| 2,121,379 | A | * | 6/1938 | Young | 52/113 |
| 2,617,617 | A | * | 11/1952 | Krastel et al. | 47/40.5 |
| D214,330 | S | * | 6/1969 | Maxwell | D8/1 |
| 3,526,056 | A | * | 9/1970 | Stropkay | 47/42 |
| D218,907 | S | * | 10/1970 | Maxwell | D8/1 |
| 4,381,621 | A | * | 5/1983 | Eby | 47/40.5 |
| 4,520,590 | A | * | 6/1985 | Schuh | 47/43 |
| 4,738,050 | A | * | 4/1988 | Dickinson | 47/43 |
| D332,729 | S | * | 1/1993 | Sessions | D8/1 |
| 5,199,677 | A | * | 4/1993 | Sessions | 248/218.4 |
| 5,402,600 | A | * | 4/1995 | Tompkins | 47/42 |
| 6,299,125 | B1 | * | 10/2001 | Zayeratabat | 248/530 |
| 6,964,126 | B1 | * | 11/2005 | Anderson | 47/42 |
| 2006/0150478 | A1 | * | 7/2006 | Gfesser | 47/32.4 |

FOREIGN PATENT DOCUMENTS

| | | | |
|---|---|---|---|
| CH | 659848 A5 | * | 2/1987 |
| DE | 3437769 A1 | * | 4/1986 |
| DE | 3912821 C1 | * | 9/1990 |

* cited by examiner

*Primary Examiner*—Rob Swiatek
*Assistant Examiner*—Kristen C Hayes
(74) *Attorney, Agent, or Firm*—John P. O'Banion; Harris Zimmerman

(57) ABSTRACT

A system and apparatus for supporting newly planted trees in which a plurality of stakes are positioned adjacent and around a supported tree. In one aspect of the invention, the individual stakes are rigidly secured together by elements which are vertically movable along the stakes and releasably secured to the stakes at desired vertical positions. In another aspect of the invention, flexible tie members interconnect the tree trunk with the stake. The connection between the tie member and its associated stake is such that the connection may be releasably locked to the stake at different vertical positions along the stake.

9 Claims, 3 Drawing Sheets

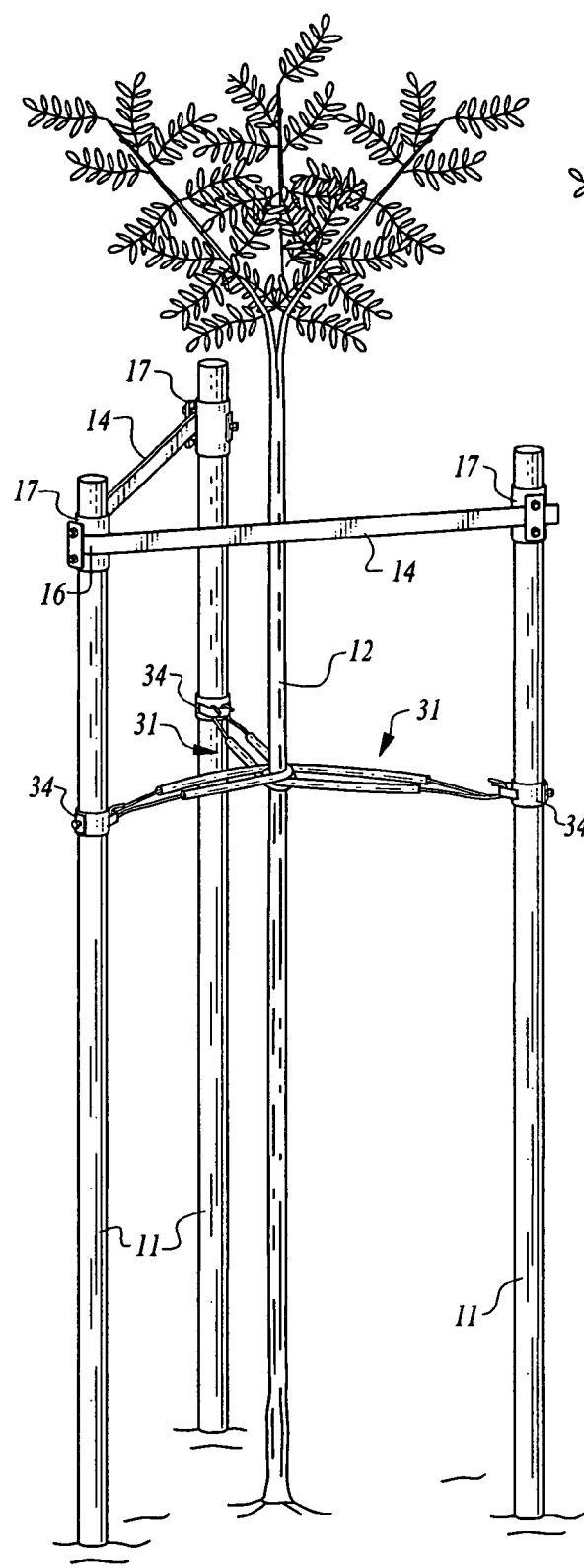
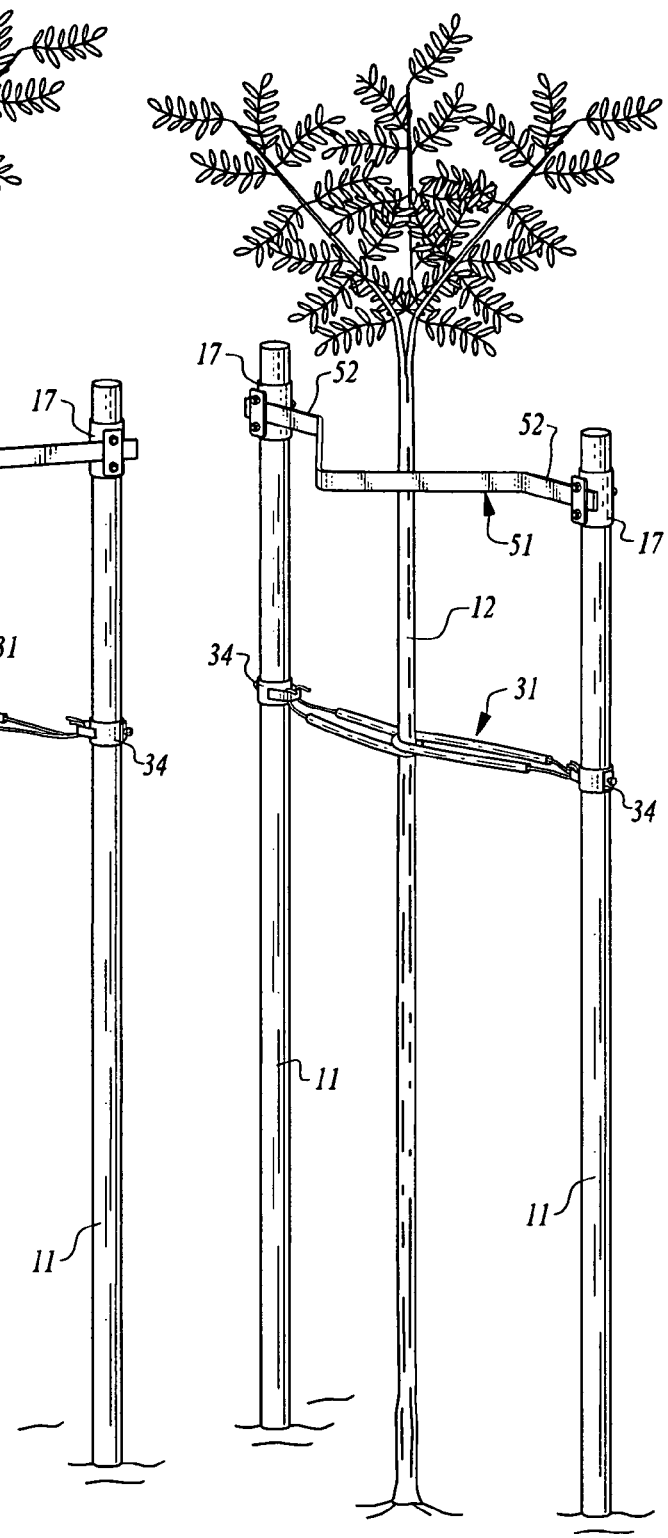
Fig. 1
Fig. 3

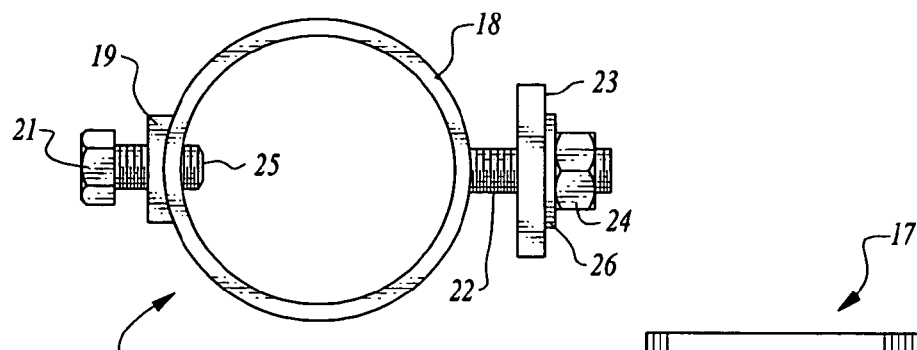
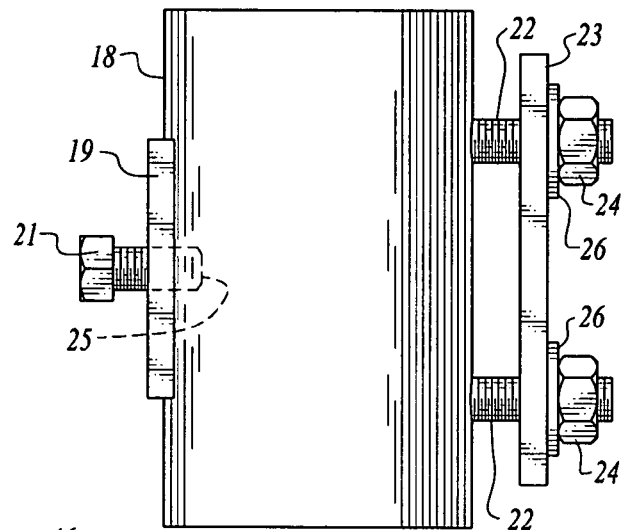
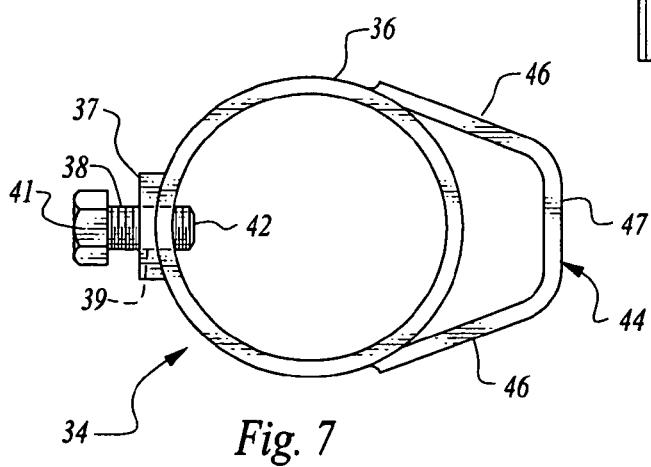
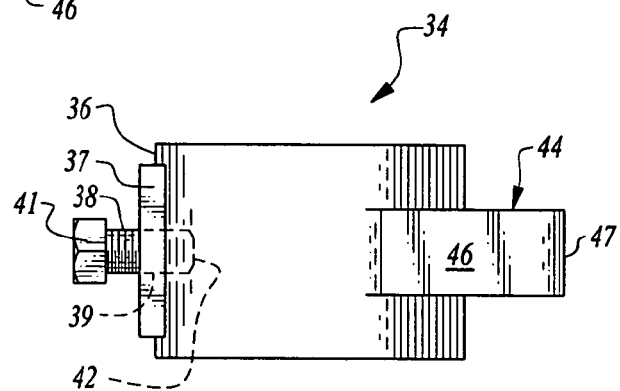
Fig. 5
Fig. 6
Fig. 7
Fig. 8

APPARATUS FOR STAKING TREES

CROSS-REFERENCE TO RELATED APPLICATIONS

This application claims priority from Provisional Application Ser. No. 60/772,306, filed Feb. 10, 2006, and entitled Tree Staking Arrangement.

FEDERALLY SPONSORED RESEARCH

Not applicable.

SEQUENCE LISTING, ETC ON CD

Not applicable.

BACKGROUND OF THE INVENTION

1. Field of the Invention

This invention relates to the staking of newly planted immature trees, and more particularly to a system in which the supporting stakes and the tree are configured to provide safe, healthy support for the tree, and which allows for ease in adjustments to prevent damage to the young tree.

2. Description of Related Art

The use of stakes in connection with efforts to stabilize newly planted trees is well known in the art. A typical young tree with a small flexible trunk is not self-supporting. Accordingly, it is common practice to drive one or more rigid stakes or poles into the ground adjacent and parallel to the tree. Ropes, ties, straps, or like flexible members are then wrapped around the tree trunk and the adjacent stake or pole in an attempt to stabilize the tree, until the subsequent root growth and trunk stability permits the tree to maintain a vertical orientation without any external assistance.

There are a number of problems with the foregoing system. In some instances, the straps or ties which interconnect the stake and the tree trunk tend to gouge or dig into the tree trunk and damage, or even destroy the tree. This is particularly true when the wind urges the tree away from its supporting stake, and/or when the tree grows and its enlarging circumference expands around the supporting strap, tie, etc.

Other problems arise due to the fact that the stakes themselves, even though made of rigid material and driven into the ground for stability may nevertheless list or lean from a normally vertical position, and thus fail to give the appropriate stabilizing effect to the tree to which the stake or stakes are attached Moving the ropes, ties, or straps vertically on the tree trunk at timed intervals will prevent damage to the tree trunk, but such movement also requires movement of these flexible members along the stakes as well. This can present a time consuming and frequently difficult operation.

BRIEF SUMMARY OF THE INVENTION

The present invention is adapted to overcome the difficulties discussed above and provide a staking arrangement which will support an immature tree trunk in a substantially vertical disposition until the roots of the tree and/or the size of the trunk have grown sufficiently to be self-supporting. All of this is accomplished without harmful damage to the tree.

A further feature of the invention is to provide a tree staking arrangement in which a plurality of stakes are driven into the ground and positioned at generally equal spacing along a circumference whose center will be occupied by the tree.

A further feature of the present invention is the provision of two discrete but cooperating systems for stabilizing a newly planted immature tree. The first system employs a plurality of stakes driven into the ground in which rigid cross-bracing of the stakes is provided. The second system features flexible ties between each stake and its adjacent tree. In each of such systems, the connection of the cross-bracing and of the ties to the stakes is such that the vertical position of the cross-bracing and of the ties may be readily adjusted before any damage to the tree occurs.

BRIEF DESCRIPTION OF THE DRAWINGS

FIG. 1 is a perspective view illustrating a three stake embodiment of the invention.

FIG. 3 is a perspective view, similar to FIG. 1, and illustrating a two stake alternative embodiment of the invention.

FIG. 5 is a top plan view of the cross brace sleeve.

FIG. 6 is an elevational view of the cross brace sleeve.

FIG. 7 is a top plan view of the tie bracket sleeve.

FIG. 8 is an elevational view of the tie bracket sleeve.

DETAILED DESCRIPTION OF THE INVENTION

The present invention for supporting immature trees involves the use of stakes, rods, or poles formed of some rigid material such as wood, metal, or the like. Preferably, and for reasons which will presently be made clear, the stakes are generally circular in cross-section for receiving cylindrical sleeves, capable of vertical adjustment or movement along the length of the stake. In connection with stake supports for newly planted trees, it is common practice to use stakes approximately ten to eleven feet long, and drive them into the ground adjacent the point on the ground where the new tree will be planted, leaving about seven to eight feet of the stake length above the ground elevation, along which the tree may be releasably tethered.

In some cases, the person planting a tree will drive a stake closely adjacent the tree trunk, and then use some form of flexible tie to releasably attach the tree and stake together. There are aspects of the present invention which may be applicable to such a procedure. However, it is better practice, particularly among professionals, to use two or three stakes per tree, and the features of this invention will be primarily described in connection with the two or three stake arrangement.

Figure 2:
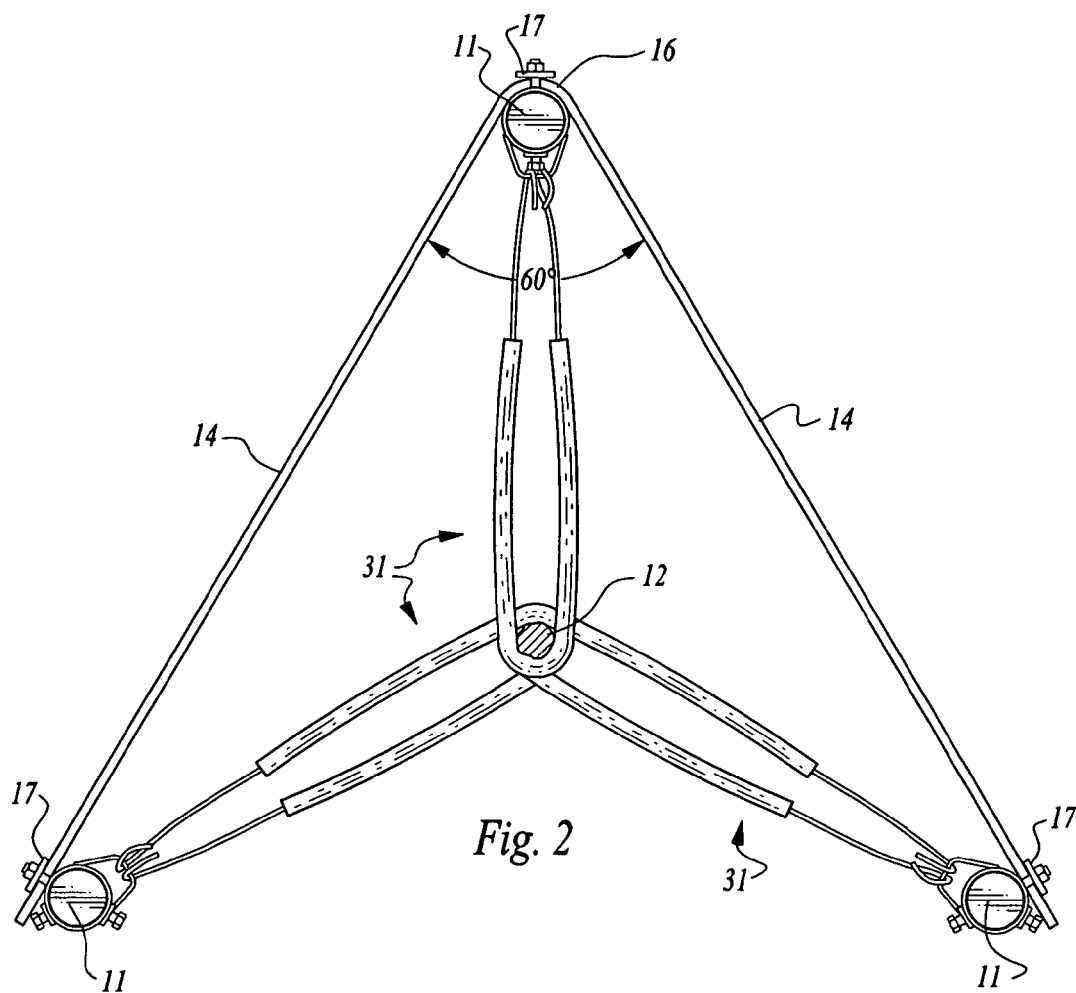
FIG. 2 is a top plan view of the three stake embodiment of the invention as shown in FIG. 1.

Referring first to FIGS. 1 and 2 of the drawings, a three stake arrangement is illustrated in which three stakes 11 are disposed generally equidistant around a tree 12. The stakes are shown as solid wooden rods, but as previously mentioned, the stakes could also be formed of metal or plastic tubing, or other rigid, form-retaining structural element which may be driven into the ground and provide lateral support to a tree which may be tied to the stake.

Even an immature tree may have substantial foliage, and under high wind conditions the wind force tends to bend the tree and impose a considerable bending or lateral force on the tied stake upwind from tree. Accordingly, as one feature of the present invention, a reinforcing or cross-bracing system is provided between the stakes and independent of their ties to the tree. As shown, the bracing comprises rigid elements 14 horizontally disposed between and attached to adjacent stakes. The positioning of the bracing elements is such that they do not interfere with, or engage the trunk of the tree 12, even during limited horizontal movement or bending of the tree under wind conditions.

Although separate elements could be used, e.g., a simple length of strap metal, having about a one inch width, it is preferable to use a single piece of strap metal bent as indicated at 16 to embrace one stake, with the angularly related legs (with an included angle of about 60°) having their distal end positions attached to two adjacent stakes. This effectively locks the three stakes together and avoids relative movement between the stakes, even under wind load conditions; and further limits movement of any stake upwind of the tree against which the wind is acting.

It is preferable that the attachment of the one or more cross-braces to the stakes be such that the height thereof can be varied as the tree grows or that additional braces be added at different elevations along the tree trunk without any direct securing of the brace to the tree. This is accomplished by means of a cross-brace sleeve 17. The sleeve includes a rigid tubular section 18 (approximately four inches long) having an internal diameter slightly larger than the external diameter of the stake 11 on which it is telescopically mounted. Section 18 may be releasably attached to its stake at any desired elevation by providing a rigid gasket 19 attached to the outside of section 18, such as by welding, provided with an internally threaded aperture connecting with an aperture in a wall of the section 18. A machine bolt 21 having an enlarged head, or other means for rotating the bolt to cause its distal end portion 25 to pass into the cavity defined by the sleeve and engage the stake disposed in the sleeve. The exposed end of portion 25 is shown flat in the drawing, and this is appropriate where the stake is plastic or metal. However, for a wood stake, the end may be pointed so as to penetrate the stake and obtain a better lock against vertical displacement.

Diametrically opposite bolt 21, a pair of vertically spaced bolts 22 are welded or otherwise secured to sleeve 18. A strap-like rigid plate 23 is provided with a pair of apertures for mounting the plate on the bolts 22. Nuts 24 and washers 26 are threaded onto the bolts and tightening of the nuts will cause plate 22 to move towards the sleeve 18 and lock the cross-brace elements 14 to the sleeve. The elements 14 may be placed in the opening or passageway defined by sleeve 18, plate 23 and bolts 22 when the nuts 24 are loosened.

The foregoing explanation describes how the stakes are releasably locked together, and an explanation will now be given of the manner in which the stakes are attached to the tree so as to control bending or lateral movement of the tree.

In general terms, flexible tie members 31 interconnect the tree 12 with the respective stakes 11. The tie members directly engage a portion of the tree and are preferably flexible and formed of relatively soft material so as to minimize any abrasive or gouging action of the ties in rubbing against the tree trunk. As will be seen in FIG. 2, each stake has a tie secured thereto and then wrapped around the tree trunk. The ties can be made of fabric, elastic material, leather, or other material such as wire which is embedded in rubber or like material which prevent the wire from cutting into the tree. There are many commercial ties available for this purpose.

In a manner somewhat similar to the cross-bracing sleeves 18 supporting the braces 14, there is disclosed tie bracket sleeves 34, best illustrated in FIGS. 7 and 8 of the drawings. Each sleeve includes a tubular sleeve portion 36 whose inner diameter is slightly larger than the outer diameter of stakes 11. Sleeve portions 36 can have a shorter axial extent (e.g., one inch) than sleeve portions 18 and are adjusted to slide vertically along its stake until it reaches a height at which the tree is to be attached to the stake. At this point, the sleeve 36 may be releasably fixed to its stake. The latter is accomplished by welding or otherwise securing a back plate 37 to the sleeve. The back is provided with an internally threaded aperture 38, through which a bolt 39 is threaded. The exposed end of the bolt has an enlarged head 41 by means of which the bolt may be threaded into or out of the cavity defined by the sleeve. The distal end 42 of the bolt will engage the stake in the cavity and lock the sleeve to the stake.

As discussed in connection with the sleeve 18, the end of bolt 42 is preferably flat if the stake is constructed of metal, but may be pointed if the stake is formed of wood.

Diametrically opposite the back plate 37 is a generally U-shaped bracket 44 whose legs 46 are welded or otherwise secured to the sleeve 36 and whose web 47 is spaced from the sleeve so as to define an opening or passageway through which the tie member may pass and/or be secured.

Figure 4:
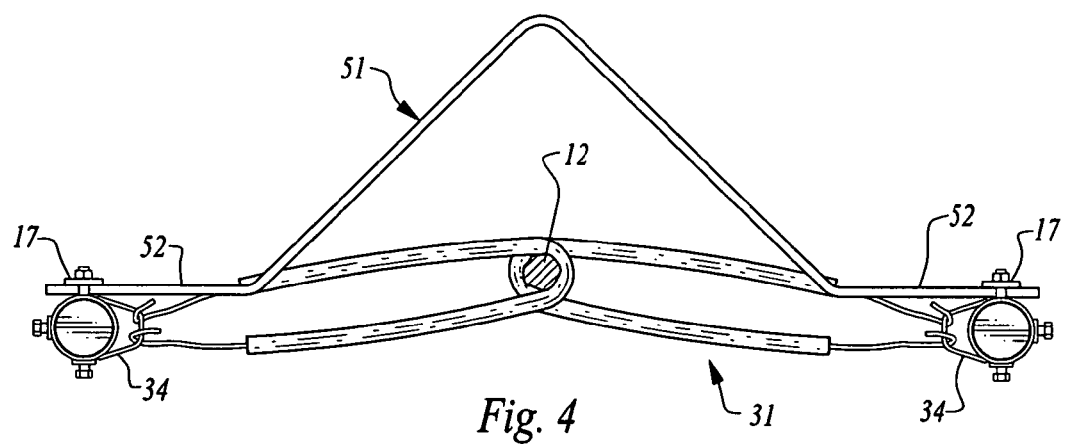
FIG. 4 is a top plan view of the two stake embodiment of the invention as shown in FIG. 3.

In those instances where it is determined that two stakes are adequate to properly support the tree, the cross-brace sleeve 17 and the tie sleeve 34 can remain the same as with the three stake arrangement. Here, and as shown in FIGS. 3 and 4, the cross-bracing includes a rigid member having a V-shaped central section 51 and co-linear flanges 52 extending from the ends of the central section. The flanges 52 may be inserted in the space or passageway between plate 23 and sleeve 18 and be locked therein upon tightening of the bolts 22.

It should be understood that when three stakes are used, it is possible to use a simple linear cross-bracing element extending between two adjacent stakes. However, with only two stakes, if a simple straight bar is used, it would be in line with or closely adjacent the tree trunk and undesirably scrape against the same.

The arrangement described and discussed herein permits multiple stakes to reinforce each other and consequently give added stability to the tree. It further permits simple changes in the height or elevation of the cross-bracing, as well as permitting more than one set of braces at different elevations. It also provides for a relatively simple manner of tying a tree to two or more stakes with the capability of easily moving the ties to different elevations along the tree trunk so as to avoid continuous abrasion or scraping at any one portion of the tree.

The invention claimed is:

1. A tree staking apparatus, comprising:
a) a tree stake;
b) a tie bracket sleeve;
c) said tie bracket sleeve comprising:
   (i) a tubular sleeve portion having interior and exterior surfaces and first and second ends;
   (ii) an aperture extending between the interior and exterior surfaces, and having threads;
   (iii) an elongated locking mechanism having threads that mate with the threads in the aperture, said locking mechanism configured for engaging a tree stake; and
   (iv) a bracket, said bracket having a web portion and a pair of legs extending from the web portion at an angle, said legs having ends that are secured to the exterior surface of the sleeve portion, said bracket being laterally oriented in relation to an axis between the first and second ends of the sleeve portion such that said legs straddle the exterior surface of the sleeve portion, said bracket configured for receiving and holding a tie member.

2. An apparatus as recited in claim 1, further comprising a tie member.

3. An apparatus as recited in claim 2, further comprising:
(a) first and second cross-brace sleeves;
(b) each said cross-brace sleeve comprising:

(i) a tubular sleeve portion having interior and exterior surfaces and first and second ends;
(ii) an aperture extending between the interior and exterior surfaces of the sleeve portion, said aperture having threads;
(iii) an elongated locking mechanism having threads that mate with the threads in the aperture, said locking mechanism configured for engaging a tree stake; and
(iv) an adjustable clamp on the exterior surface of the sleeve portion, said clamp having an elongated plate that is longitudinally oriented in relation to an axis between the first and second ends of the sleeve portion, said clamp configured for receiving and holding an end of a cross-brace.

4. An apparatus as recited in claim 3, further comprising a rigid cross-brace.

5. An apparatus as recited in claim 4, wherein said cross-brace comprises a rigid member having a V-shaped central section and co-linear flanges extending from ends of the central section.

6. A tree staking apparatus, comprising:
a) a plurality of tree stakes;
b) a tie bracket sleeve;
c) said tie bracket sleeve comprising:
  (i) a tubular sleeve portion having interior and exterior surfaces and first and second ends;
  (ii) an aperture extending between the interior and exterior surfaces, and having threads;
  (iii) an elongated locking mechanism having threads that mate with the threads in the aperture, said locking mechanism configured for engaging a tree stake; and
  (iv) a bracket, said bracket having a web portion and a pair of legs extending from the web portion at an angle, said legs having ends that are secured to the exterior surface of the sleeve portion, said bracket being laterally oriented in relation to an axis between the first and second ends of the sleeve portion such that said legs straddle the exterior surface of the sleeve portion, said bracket configured for receiving and holding a tie member;
d) first and second cross-brace sleeves; and
e) a rigid cross-brace;
f) each said cross-brace sleeve comprising:
  (i) a tubular sleeve portion having interior and exterior surfaces and first and second ends;
  (ii) an aperture extending between the interior and exterior surfaces of the sleeve portion, said aperture having threads;
  (iii) an elongated locking mechanism having threads that mate with the threads in the aperture, said locking mechanism configured for engaging a tree stake; and
  (iv) an adjustable clamp on the exterior surface of the sleeve portion, said clamp having an elongated plate that is longitudinally oriented in relation to an axis between the first and second ends of the sleeve portion, said clamp configured for receiving and holding an end of the cross-brace.

7. A tree staking apparatus as recited in claim 6, wherein said cross-brace comprises a rigid member having a V-shaped central section and co-linear flanges extending from ends of the central section.

8. A tree staking apparatus, comprising:
a) a plurality of tree stakes;
b) first and second tie bracket sleeves;
c) each said tie bracket sleeve comprising:
  (i) a tubular sleeve portion having interior and exterior surfaces and first and second ends;
  (ii) an aperture extending between the interior and exterior surfaces, and having threads;
  (iii) an elongated locking mechanism having threads that mate with the threads in the aperture, said locking mechanism configured for engaging a tree stake; and
  (iv) a bracket, said bracket having a web portion and a pair of legs extending from the web portion at an angle, said legs having ends that are secured to the exterior of the sleeve portion, said bracket being laterally oriented in relation to an axis between the first and second ends of the sleeve portion such that said legs straddle the exterior surface of the sleeve portion, said bracket configured for receiving and holding a tie member;
e) first and second cross-brace sleeves;
e) each said cross-brace sleeve comprising:
  (i) a tubular sleeve portion having interior and exterior surface and first and second ends;
  (ii) an aperture extending between the interior and exterior surfaces of the sleeve portion, said aperture having threads;
  (iii) an elongated locking mechanism having threads that mate with the threads in the aperture, said locking mechanism configured for engaging a tree stake; and
  (iv) an adjustable clamp on the exterior surface of the sleeve portion, said clamp having an elongated plate that is longitudinally oriented in relation to an axis between the first and second ends of the sleeve portion, said clamp configured for receiving and holding an end of a cross-brace;
f) a rigid cross-brace; and
f) first and second tie members.

9. A tree staking system as recited in claim 8, wherein said cross-brace comprises a rigid member having a V-shaped central section and co-linear flanges extending from ends of the central section.

\* \* \* \* \*

UNITED STATES PATENT AND TRADEMARK OFFICE
CERTIFICATE OF CORRECTION

PATENT NO. : 7,661,224 B1  Page 1 of 1
APPLICATION NO. : 11/471852
DATED : February 16, 2010
INVENTOR(S) : Robert Poyas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this

Thirtieth Day of November, 2010

David J. Kappos
*Director of the United States Patent and Trademark Office*